Jan. 19, 1926. 1,570,598
F. G. FOLBERTH ET AL
WINDSHIELD CLEANER
Filed Feb. 4, 1924 3 Sheets-Sheet 1
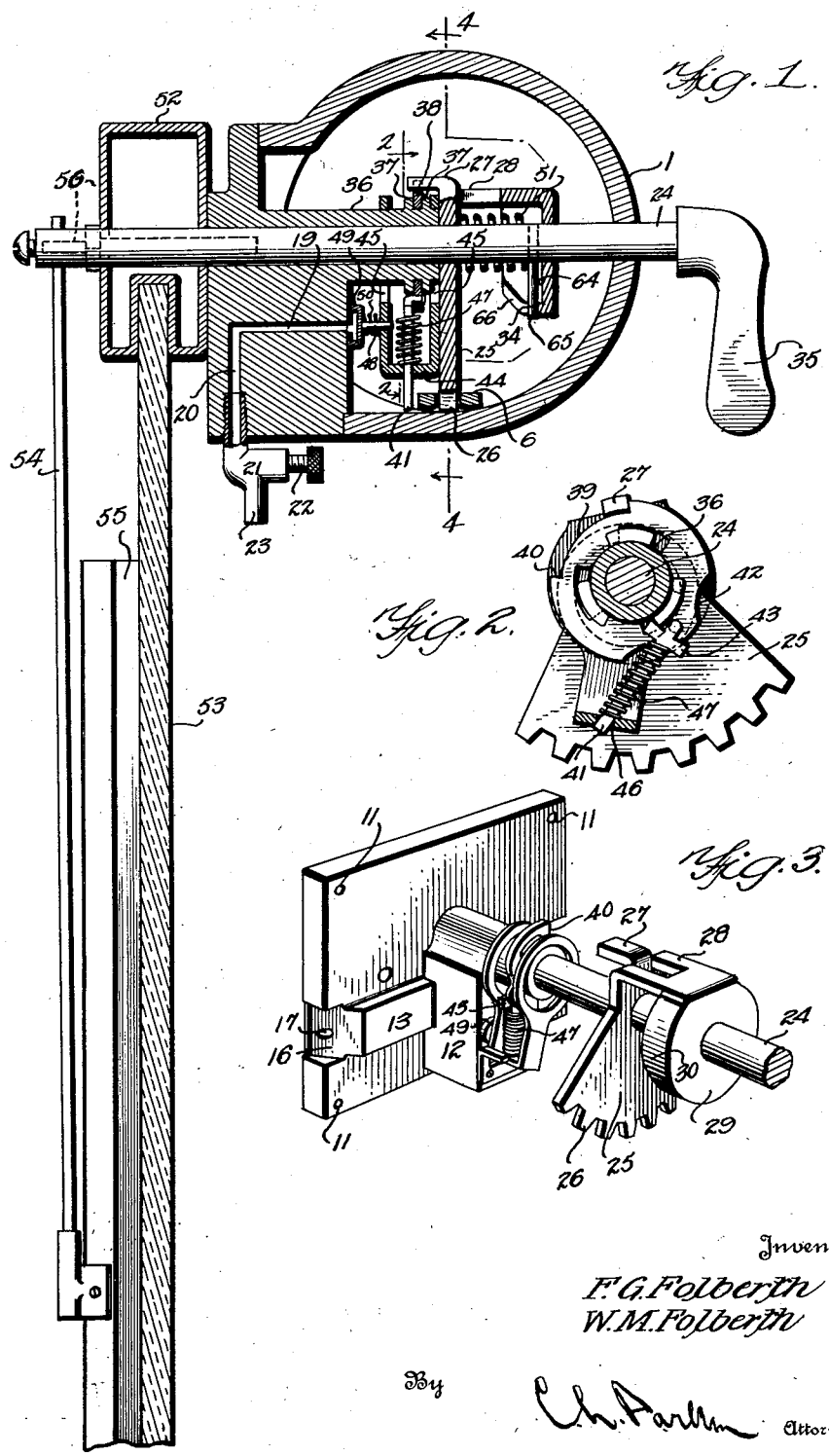

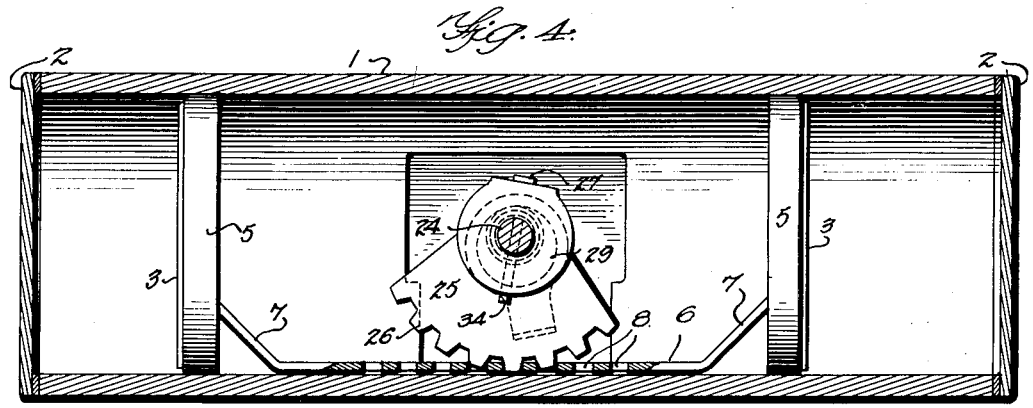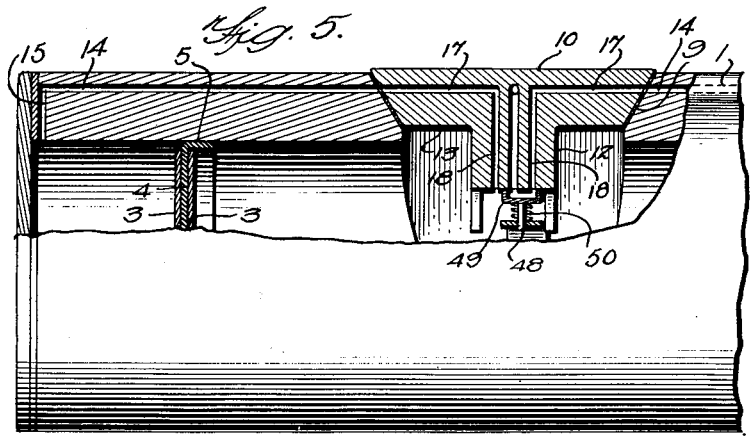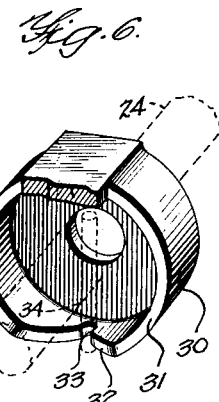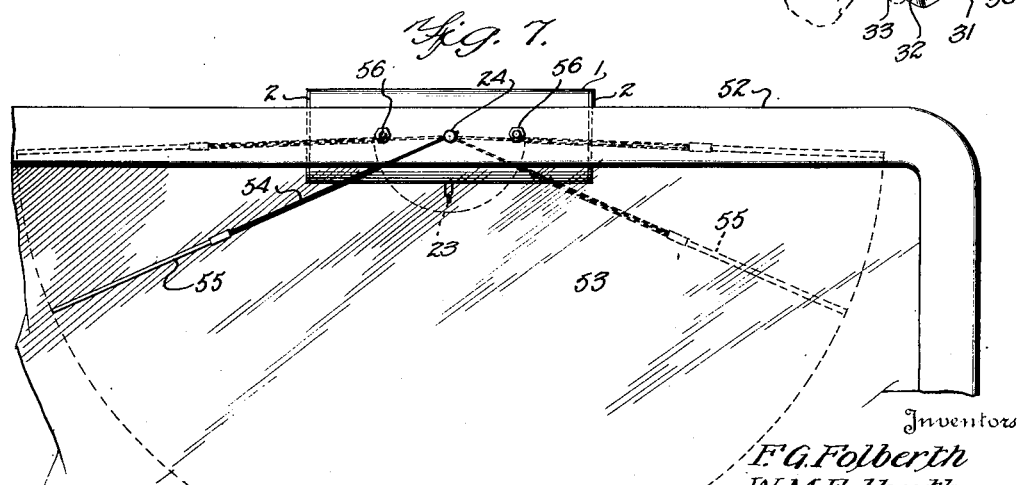

Jan. 19, 1926.  1,570,598
F. G. FOLBERTH ET AL
WINDSHIELD CLEANER
Filed Feb. 4, 1924   3 Sheets-Sheet 3
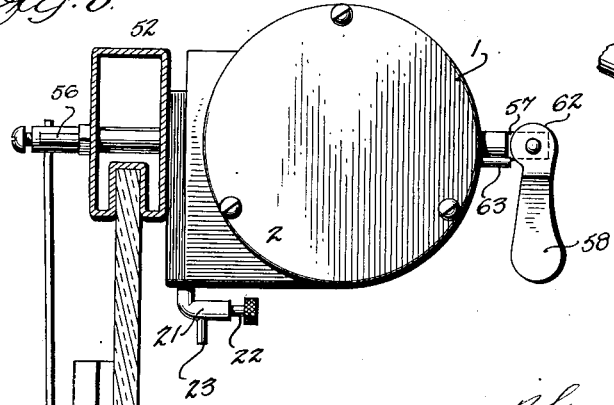
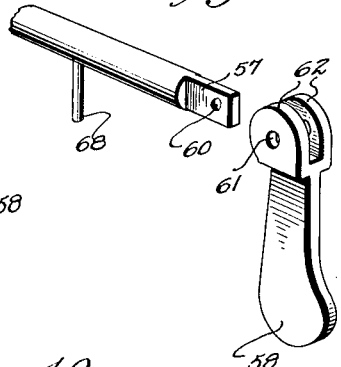
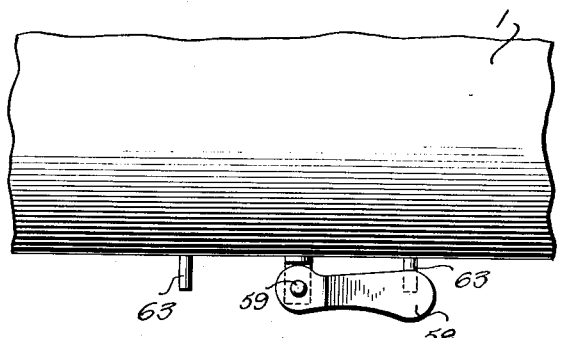
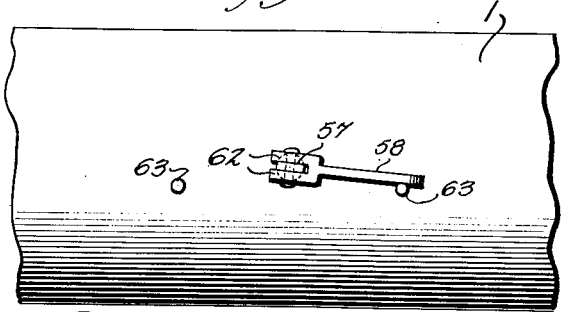
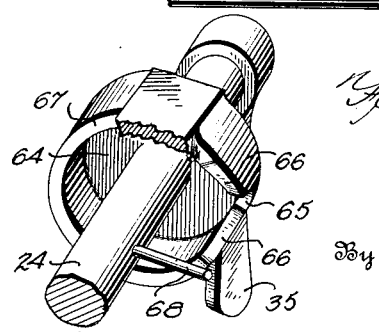
Inventors
F. G. Folberth
W. M. Folberth
By
Attorney Patented Jan. 19, 1926.

1,570,598

UNITED STATES PATENT OFFICE.

FREDERICK G. FOLBERTH AND WILLIAM M. FOLBERTH, OF CLEVELAND, OHIO, ASSIGNORS TO TRICO PRODUCTS CORPORATION, OF BUFFALO, NEW YORK, A CORPORATION OF NEW YORK.

WINDSHIELD CLEANER.

Application filed February 4, 1924. Serial No. 690,552.

*To all whom it may concern:*

Be it known that we, FREDERICK G. FOLBERTH and WILLIAM M. FOLBERTH, citizens of the United States, residing at Cleveland, in the county of Cuyahoga and State of Ohio, have invented certain new and useful Improvements in Windshield Cleaners, of which the following is a specification.

This invention relates to windshield cleaners.

An object of the invention is the provision of improved means for moving the cleaner arm to a substantially horizontal position and out of contact with the windshield when it is not in use.

A further object is the provision of means for performing these functions which may be employed in connection with a known type of windshield cleaner.

In the present invention, we provide a cleaner having a cleaner shaft, a pin carried by the shaft, and a cam connected to the drive mechanism and adapted to be coupled to the shaft by means of the pin, the cam being provided with a notch for the reception of the pin whereby the shaft may be turned manually to dispose the cleaner in a substantially horizontal position and out of contact with the glass.

In the accompanying drawings, we have shown several embodiments of the invention. In this showing:

Figure 1 is a central vertical sectional view of a portion of a windshield showing the windshield cleaner in position thereon, Figure 2 is a detail sectional view on line 2—2 of Figure 1, Figure 3 is a perspective view of the closure plate and shaft, Figure 4 is a vertical longitudinal sectional view on line 4—4 of Figure 1, Figure 5 is a plan view, parts being shown in section to show the passages connected to the end of the cylinder, Figure 6 is a perspective view of the cam, Figure 7 is a front elevation showing the normal path of travel of the cleaner element and showing the position of the cleaner element when moved to an inoperative position, Figure 8 is a vertical sectional view of a windshield showing a cleaner motor in elevation and showing another form of the invention, Figure 9 is a perspective view of the shaft and handle, Figure 10 is a plan view of a portion of the cleaner motor, Figure 11 is a front elevation, and, Figure 12 is a perspective view of a portion of the shaft and the cam.

Referring to Figures 1 to 7 of the drawings, there is shown a windshield cleaner substantially of the same construction as disclosed in our copending application filed October 31, 1923, Serial No. 671,937. In the drawings, the reference numeral 1 designates the casing of a motor which, as shown, may be cylindrical and which is provided with cylinder heads 2, arranged at opposite ends and retained in position by means of suitable fastening elements. A pair of pistons are arranged within the cylinder and suitably spaced from each other. Each of the pistons consists of disks 3 formed of any suitable material and having a strip 4 of suitable packing material arranged between them. The packing material is of larger diameter than the interior diameter of the cylinder, forming a flange 5. The parts of the pistons are secured to each other by suitable fastening elements and the pistons are connected to each other by a connecting member 6. This member is provided with inclined portions 7 adjacent each end and the terminals (not shown) are arranged parallel to the inner face of the pistons and secured thereto in any suitable manner. The body portion of the connecting member is provided with spaced openings 8 forming a rack for the transmission of power from the pistons.

The clyinder is provided with a relatively large opening arranged intermediate its ends and this opening is provided with inclined faces 9. A closure plate 10 is arranged over the opening, the closure plate being provided with suitable openings 11 for the reception of bolts or other fastening elements. The closure plate is provided with an enlargement 12 on its inner face and is further provided with horizontally disposed ribs 13 extending from each side of the enlargement. Conduits 14 are arranged in the cylinder wall and the ends of these conduits are connected to transverse ports 15 communicating with the ends of the cylinder. The closure plate is provided with beveled portions 16, adapted to engage the beveled faces 9 on the cylinder. The rib portions of the closure plate are provided with passages 17 communicating with the conduits 13. These passages in turn communicate with transverse passages 18 extending inwardly through the enlargement 12 to its inner face. Between the passages 18, there is provided a passage 19 which in turn communicates with a vertical passage 20, extending to the bottom of the closure plate. The lower end of this passage is enlarged and threaded to receive a coupling 21. This coupling is provided with a valve seat adapted to be engaged by a manually controlled valve having a valve stem 22. The lower end of the coupling is provided with an inlet opening 23, adapted to be connected to a suitable source of suction or pressure, such as the intake manifold of an internal combustion engine (not shown) by means of a flexible tube (not shown).

A cleaner shaft 24 is arranged in an opening in the closure plate and enlargement 12. A plate 25 is mounted on the shaft. This plate is arcuate shaped and is provided with teeth 26 adapted to mesh with the openings 8 in the connecting member 6. The plate extends upwardly beyond the shaft and is provided with an arm or finger 27, projecting in one direction. The plate is provided with a laterally extending portion 28, extending in the opposite direction and carrying a cam or disk 29 arranged on the shaft. As shown in Figure 6 of the drawings, the disk is provided with a flange 30, having a substantially straight wall 31 throughout the greater portion of its circumference. Adjacent the bottom of the disk, there is provided inclined portions 32 terminating in a notch 33. A pin 34 is carried by the shaft and is normally received in this notch. The end of the shaft projects from the casing and is provided with a suitable handle 35.

The enlargement 12 is provided with an inwardly extending sleeve 36 (see Figure 1). The sleeve is provided with a plurality of spaced lugs 37 arranged in pairs and forming a groove between them. A disk 38 is mounted over the sleeve, the disk being provided with a central opening substantially the same size as the diameter of the sleeve and being further provided with recesses to permit the disk to pass over the outer set of lugs 37 and be arranged in the groove between the lugs. The upper edge of the disk is provided with a reduced portion 39, forming shoulders 40, adapted to be engaged by the arm or finger 27. A substantially T-shaped arm 41 is pivotally connected to the bottom of the disk and the disk is provided with cut out portions 42 on opposite sides of the pivot. The T-shaped arm is provided with transverse portions 43 which are arranged on one side of the disk in the same vertical plane with the inner set of lugs 37 (see Figure 1). A valve supporting member comprising a substantially U-shaped arm 44 is adapted to embrace the T-shaped arm and this member is provided with an opening 45 in one arm for the reception of the sleeve 36. The base of the U-shaped member is provided with an opening 46 for the reception of the lower end of the T-shaped arm. A spring 47 is arranged on the T-shaped arm between the transverse portions 43 and the base of the U-shaped member 44. A valve stem 48 is mounted in a suitable opening in one of the arms of the valve supporting member and this valve stem carries a cup-shaped valve 49 adapted to fit over the end of the passage 19 and the end of either of the passages 18 is shown in Figure 5 of the drawings. A spring 50 is arranged around the valve stem to retain the valve in engagement with the face of the enlargement. Between the arcuate plate 25 and the cam, there is provided a spring 51 surrounding the shaft and adapted to normally force it to the right in Figure 1 of the drawings.

The shaft 24 projects a slight distance outside of the motor and is adapted to pass through a windshield frame 52. The windshield frame is of the usual construction and is adapted to receive and support a windshield 53 of glass or other transparent material. A cleaner arm 54 is secured to the shaft exteriorly of the windshield, the cleaner arm being preferably formed of resilient material to permit adjustment toward the face of the windshield. A cleaner member 55 is carried by the cleaner arm and is adapted to contact with the windshield. Suitable stop pins 56 are arranged in the windshield frame on opposite sides of the shaft 24.

In the form of the invention shown in Figures 8 to 12 of the drawings, the construction of the motor valves and valve actuating mechanism is the same as heretofore described. In this form of the invention, the shaft 24 is provided with a reduced portion 57 on its inner end and the handle 58 is pivotally mounted thereon by means of a pin 59 passing through an opening 60 in the reduced portion of the shaft and through openings 61 in the forked end 62 of the handle. Suitable lugs or pins 63 are formed on the face of the motor casing, adapted to engage the handle to retain the shaft in a desired position. A cam 64, similar to the cam 29, is arranged on the shaft and this cam is provided with a notch 65, normally disposed in a horizontal position. The cam is provided with inclined portions 66 on each side of the notch, communicating with a straight portion 67. A pin 68 is mounted in the shaft at right angles to the handle 58.

The normal operation of the cleaner motor is the same as that described in our co-pending application. The valve 49 is adapted to be shifted by the valve actuating mechanism to alternately place one of the passages 18 in communication with the central passage 19 and thus connect it to the source of suction. This is accomplished by the movement of the disk 38 which is actuated by the segmental gear 25. As the gear oscillates, the arm 27 alternately engages the shoulders 40, oscillating the disk. As the disk moves from the position shown in Figure 2 of the drawings, in a clockwise direction, the distance between the pivot of the arm 41 and the opening 46 in the U-shaped valve supporting arm decreases and the spring 47 is compressed. When the upper end of the arm passes the center point, the spring snaps the disk to its limit of movement and shifts the valve supporting arm to the other side of the center, thus shifting the valves.

When the cleaner is to be placed out of use, it is desirable to move the cleaner arm and cleaner element from the normal position shown in Figure 7 of the drawings to a substantially horizontal position shown in dotted lines behind the windshield frame. To accomplish this, the cleaner motor is cut off with the cleaner arm in the vertical position shown in Figure 1 of the drawings, and the handle 35 is then moved inwardly to remove the pin 34 from the notch 33. The shaft is then rotated by hand until the cleaner arm engages one of the stop pins 56. The pin rides over the faces 32 and 31 of the cam retaining the spring 52 under tension and moving the cleaner element outwardly to relieve the normal tension exerted by the cleaner arm 54 when the device is in operative position. The arc inscribed by the inclined portions 32 of the cam in its travels is slightly greater than the arc inscribed by the cleaner element in its movements therefore as soon as the motor is again placed in communication with the source of suction, the cam, revolving with the gear 25 moves upwardly until the pin 34 begins to ride over the inclined surface 32. The tension of the spring then forces the pin downwardly into the notch 33 coupling the shaft to the drive mechanism.

In the form of the invention shown in Figures 8 to 12 of the drawings, the operation is substantially the same. To swing the cleaner to an inoperative position, the handle 58 is first swung on its pivot to permit it to clear the stop 63. After the shaft 24 has been turned, the handle is again moved to its normal position and the stop 63 retains it in raised position and retains the cleaner arm in inoperative position. The movement of the pin 68 over the cam surface forces the cleaner element outwardly away from the window. When the motor is again placed in operation, the cam revolves and the pin rides over the cam surface 66 into the notch 65, as previously described.

It is to be understood that the forms of the invention herewith shown and described are to be taken as preferred examples of the same and that various changes in the shape, size, and arrangement of parts may be resorted to without departing from the spirit of the invention or the scope of the subjoined claims.

We claim:

1. In a suction operated windshield cleaner, a motor casing, an actuating member mounted in said casing, a shaft extending through said casing and projecting therefrom, one end of said shaft being adapted to receive a cleaner element normally maintained in contact with the windshield to be cleaned under tension, a disk surrounding said shaft and operatively connected to said actuating member, said disk being provided with a notch, and being provided with inclined portions on each side of said notch, a pin carried by said shaft and adapted to be received in said notch to connect said shaft to said disk, and a spring surrounding said shaft and normally retaining said pin in said notch.

2. In a suction operated windshield cleaner, a motor casing, an actuating member mounted in said casing, a shaft extending through said casing, one end of said shaft being adapted to receive a cleaner element adapted to be retained in contact with the windshield to be cleaned under tension, a disk surrounding said shaft, gearing connecting said disk and said actuating member, said disk being provided with a notch and being provided with inclined portions on opposite sides of said notch, a pin carried by said shaft and normally received in said notch, and a spring surrounding said shaft and engaging said pin to retain it in said notch.

3. In a suction operated windshield cleaner, a motor casing, an actuating member mounted in said casing, a shaft extending through said casing, said shaft being adapted to carry a cleaner element normally maintained in contact with a windshield to be cleaned under tension, a disk surrounding said shaft, gearing connecting said disk to said actuating member, said disk being provided with a peripheral flange, said flange being provided with straight portions, inclined portions extending from said straight portions, and a notch arranged between said inclined portions, a pin carried by said shaft and normally received in said notch, and a spring surrounding said shaft and engaging said pin to normally retain it in said notch.

4. A device constructed in accordance with claim 3, wherein said shaft is provided with a handle arranged exteriorly of said casing, and stops are arranged on said casing and adapted to engage said handle to retain said shaft in inoperative position.

5. In a windshield cleaner, a motor casing, an actuating member mounted in said casing, a shaft extending from said casing, a wiper, an arm supporting the wiper from the shaft, said shaft being mounted to rock to and fro and to have limited endwise movement whereby said wiper is caused to move on said windshield glass or may be spaced from the plane of said windshield glass, and selective means interposed between said shaft and said actuating member for causing said shaft to rock as said actuating member operates or for shifting said shaft endwise to space said wiper from the plane of the windshield glass.

6. In a windshield cleaner, a casing, a piston therein, a wiper, a wiper actuating shaft adapted by one movement to operate a wiper on the windshield glass and by another movement to space the wiper from the glass, a part coupled for movement to said piston, and a part on said shaft, said parts being adapted normally to engage to actuate said shaft when said piston operates, said parts being releasably engaged whereby said shaft may be actuated independently of said piston to space the wiper from the windshield glass for parking the same.

In testimony whereof, we affix our signatures.

FREDERICK G. FOLBERTH.
WILLIAM M. FOLBERTH